United States Patent
Dhuse et al.

(10) Patent No.: US 10,133,631 B2
(45) Date of Patent: Nov. 20, 2018

(54) MULTI OPTION REBUILDING IN A DISPERSED STORAGE NETWORK

(71) Applicant: International Business Machines Corporation, Armonk, NY (US)

(72) Inventors: Greg R. Dhuse, Chicago, IL (US); Wesley B. Leggette, Chicago, IL (US); Jason K. Resch, Chicago, IL (US); Trevor J. Vossberg, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 31 days.

(21) Appl. No.: 15/264,160

(22) Filed: Sep. 13, 2016

(65) Prior Publication Data

US 2017/0123916 A1    May 4, 2017

Related U.S. Application Data (60) Provisional application No. 62/248,636, filed on Oct. 30, 2015.

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC .. G06F 11/1076; G06F 3/0619; G06F 3/0622; G06F 3/0623; G06F 3/064; G06F 3/067; G06F 9/4856; G06F 11/1092; G06F 11/1096; G06F 11/2094; G06F 12/0646; G06F 2201/805; G06F 2201/82;
(Continued)

(56) References Cited

U.S. PATENT DOCUMENTS 4,092,732 A    5/1978 Ouchi
5,454,101 A    9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Albert Decady
*Assistant Examiner* — Osman M Alshack
(74) *Attorney, Agent, or Firm* — Garlick & Markison; Timothy W. Markison; Shayne X. Short (57) ABSTRACT

A method includes identifying an encoded slice for rebuilding. The method further includes determining whether the set of encoded slices is stored in an encrypted section of a vault or within an unencrypted section of the vault. The method further includes, when the set of encoded slices is stored in the unencrypted section of the vault, determining whether the set of storage units have viewing rights. The method further includes, when the set of storage units does not have the viewing rights, enabling a restricted rebuilding process to rebuild the encoded slice. The method further includes, when the set or storage units does have the viewing rights, enable an unrestricted rebuilding process to rebuild the encoded slice.

18 Claims, 9 Drawing Sheets

(51) Int. Cl.

| | | |
|---|---|---|
| *H03M 13/15* | (2006.01) | |
| *G06F 3/06* | (2006.01) | |
| *H04L 29/06* | (2006.01) | |
| *H04L 9/08* | (2006.01) | |
| *G06F 11/20* | (2006.01) | |
| *G06F 9/48* | (2006.01) | |
| *H04L 9/14* | (2006.01) | |
| *H04L 29/08* | (2006.01) | |
| *G06F 12/06* | (2006.01) | |
| *H04L 12/24* | (2006.01) | |
| *H04L 12/927* | (2013.01) | |
| *H03M 13/37* | (2006.01) | |

(52) U.S. Cl.
CPC .......... *G06F 3/0619* (2013.01); *G06F 3/0622* (2013.01); *G06F 3/0623* (2013.01); *G06F 9/4856* (2013.01); *G06F 11/1092* (2013.01); *G06F 11/1096* (2013.01); *G06F 11/2094* (2013.01); *G06F 12/0646* (2013.01); *H03M 13/1515* (2013.01); *H03M 13/3761* (2013.01); *H04L 9/0861* (2013.01); *H04L 9/14* (2013.01); *H04L 41/0816* (2013.01); *H04L 47/803* (2013.01); *H04L 63/0428* (2013.01); *H04L 63/0457* (2013.01); *H04L 63/06* (2013.01); *H04L 63/068* (2013.01); *H04L 63/08* (2013.01); *H04L 63/101* (2013.01); *H04L 67/1097* (2013.01); *G06F 2201/805* (2013.01); *G06F 2201/82* (2013.01); *G06F 2212/1008* (2013.01); *G06F 2212/657* (2013.01)

(58) Field of Classification Search
CPC ...... G06F 2212/1008; G06F 2212/657; H03M 13/1515; H03M 13/3761; H04L 9/0861; H04L 9/14; H04L 41/0816; H04L 47/803; H04L 63/0428; H04L 63/0457; H04L 63/06; H04L 63/068; H04L 63/08; H04L 63/101; H04L 67/1097
USPC .......................................... 714/752, 763, 764
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Saran et al. |
| 2007/0283167 A1 | 12/2007 | Venters, III et al. |
| 2008/0183975 A1* | 7/2008 | Foster ................. G06F 11/1076 711/153 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0029711 A1* | 2/2011 | Dhuse ................. G06F 11/1076 711/4 |
| 2011/0029809 A1* | 2/2011 | Dhuse ................. G06F 11/1076 714/6.1 |
| 2012/0054500 A1* | 3/2012 | Dhuse ................. G06F 11/1076 713/189 |
| 2012/0254619 A1* | 10/2012 | Dhuse ..................... H04L 9/085 713/176 |
| 2013/0238932 A1* | 9/2013 | Resch ..................... G06F 21/64 714/20 |
| 2013/0346809 A1* | 12/2013 | Kazi ..................... G06F 3/0619 714/48 |
| 2014/0298085 A1* | 10/2014 | Baptist ................. G06F 11/0793 714/6.2 |
| 2014/0298135 A1* | 10/2014 | Dhuse ..................... H04L 69/40 714/763 |
| 2014/0344646 A1* | 11/2014 | Vas ..................... H04L 67/1097 714/764 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

(56) References Cited

OTHER PUBLICATIONS

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

MULTI OPTION REBUILDING IN A DISPERSED STORAGE NETWORK

CROSS-REFERENCE TO RELATED APPLICATIONS

The present U.S. Utility Patent Application claims priority pursuant to 35 U.S.C. § 119(e) to U.S. Provisional Application No. 62/248,636, entitled "SECURELY STORING DATA IN A DISPERSED STORAGE NETWORK", filed Oct. 30, 2015, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within a cloud storage system, self-healing or rebuilding of lost or corrupted data elements is an important aspect for reliable data storage. For example, when a disk drive fails, the data it stores is lost but can be recreated from other data. As a specific example, in a dispersed storage system that uses error correction, data is encoded into a plurality of encoded data pieces (e.g., n pieces) of which, any combination of "m" encoded data pieces is sufficient to reconstruct the data. As such, when an encoded data piece is lost, it can be recreated by recovering the data and re-encoding the data to reproduce the "n" encoded data pieces, which includes a new copy of the lost encoded data piece.

DETAILED DESCRIPTION OF THE INVENTION

Figure 1:
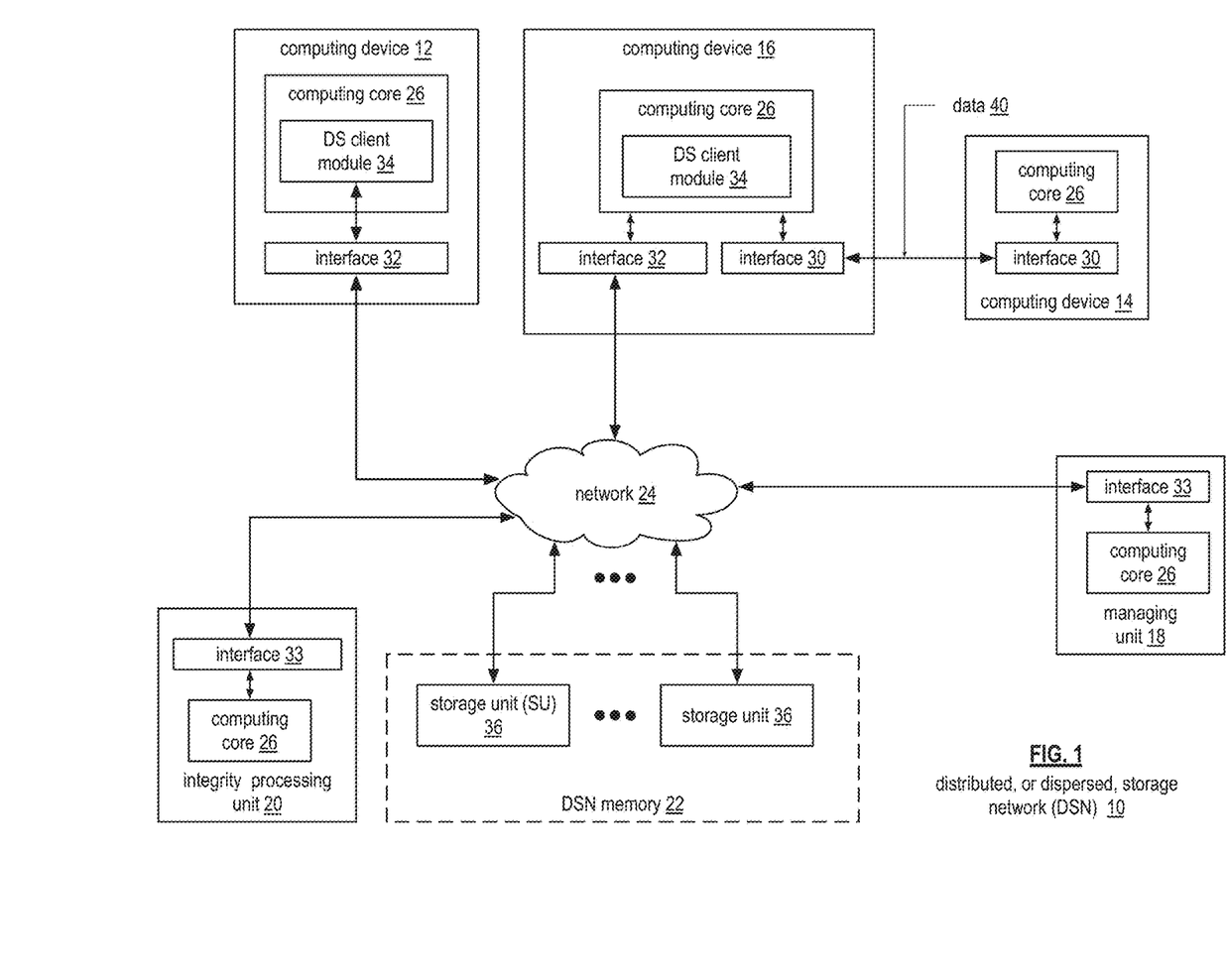
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
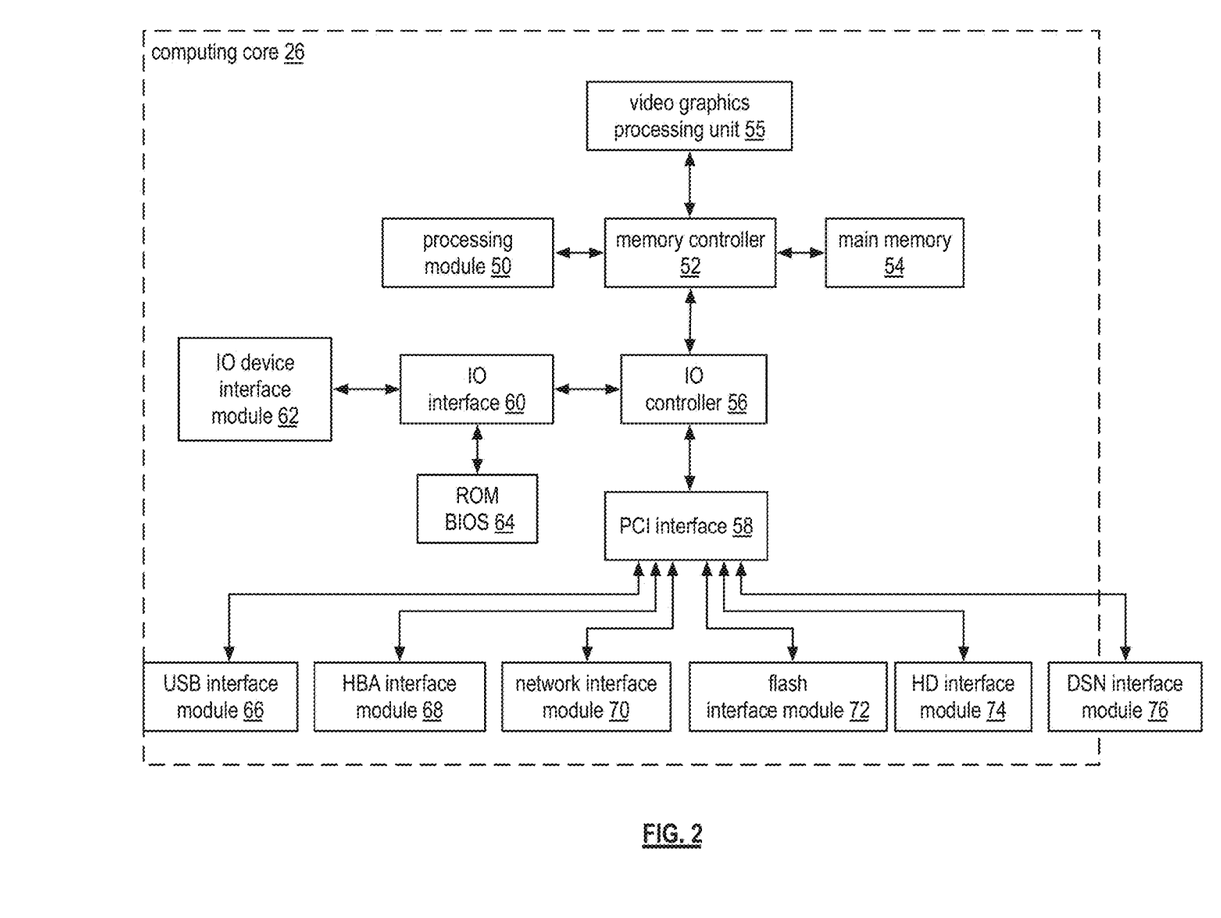
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
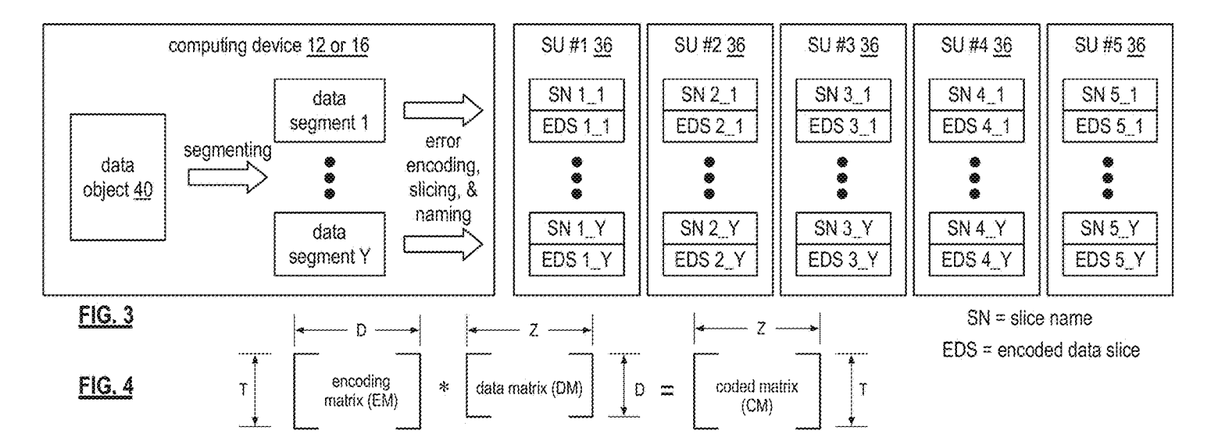
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
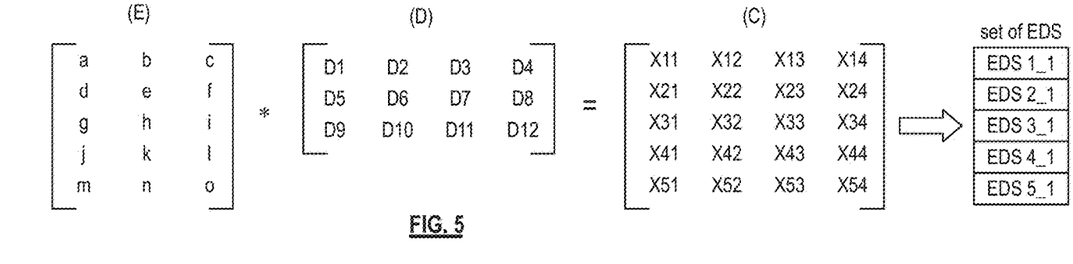
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
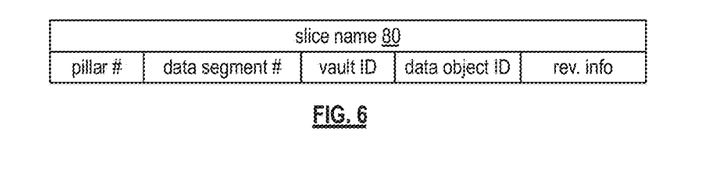
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
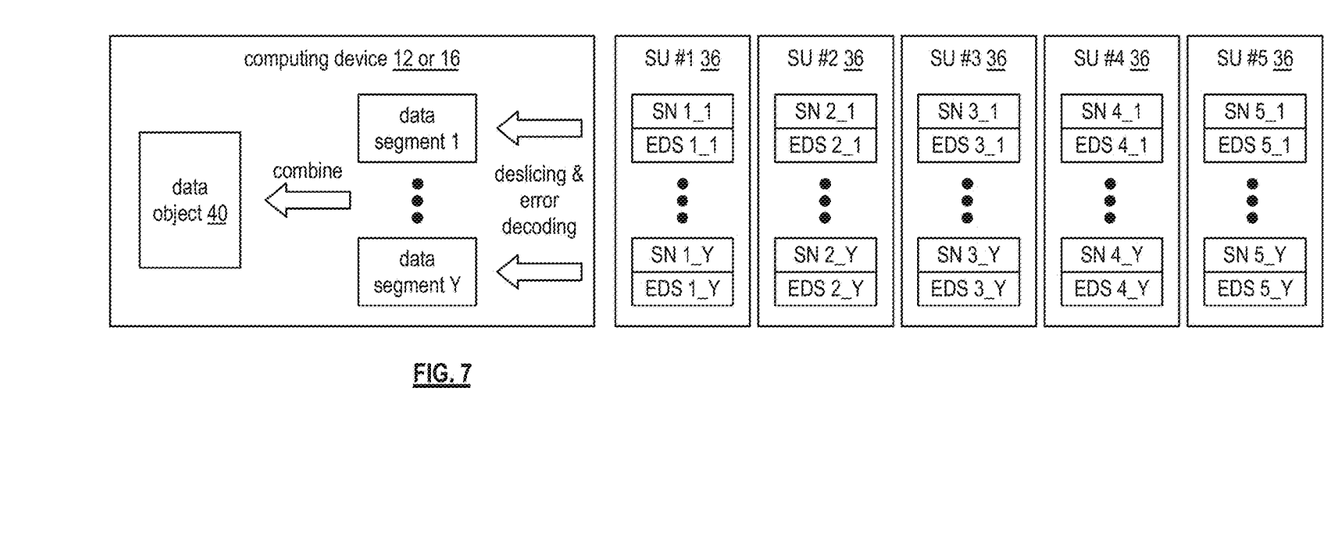
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
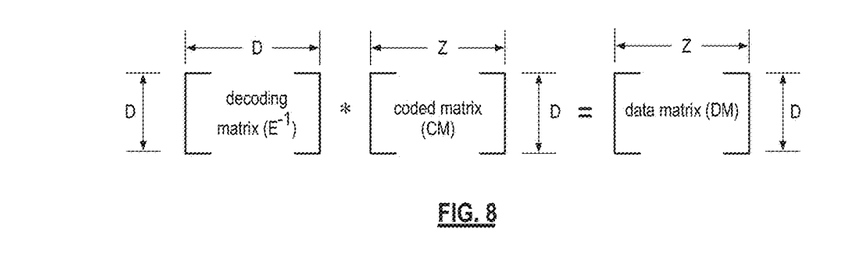
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
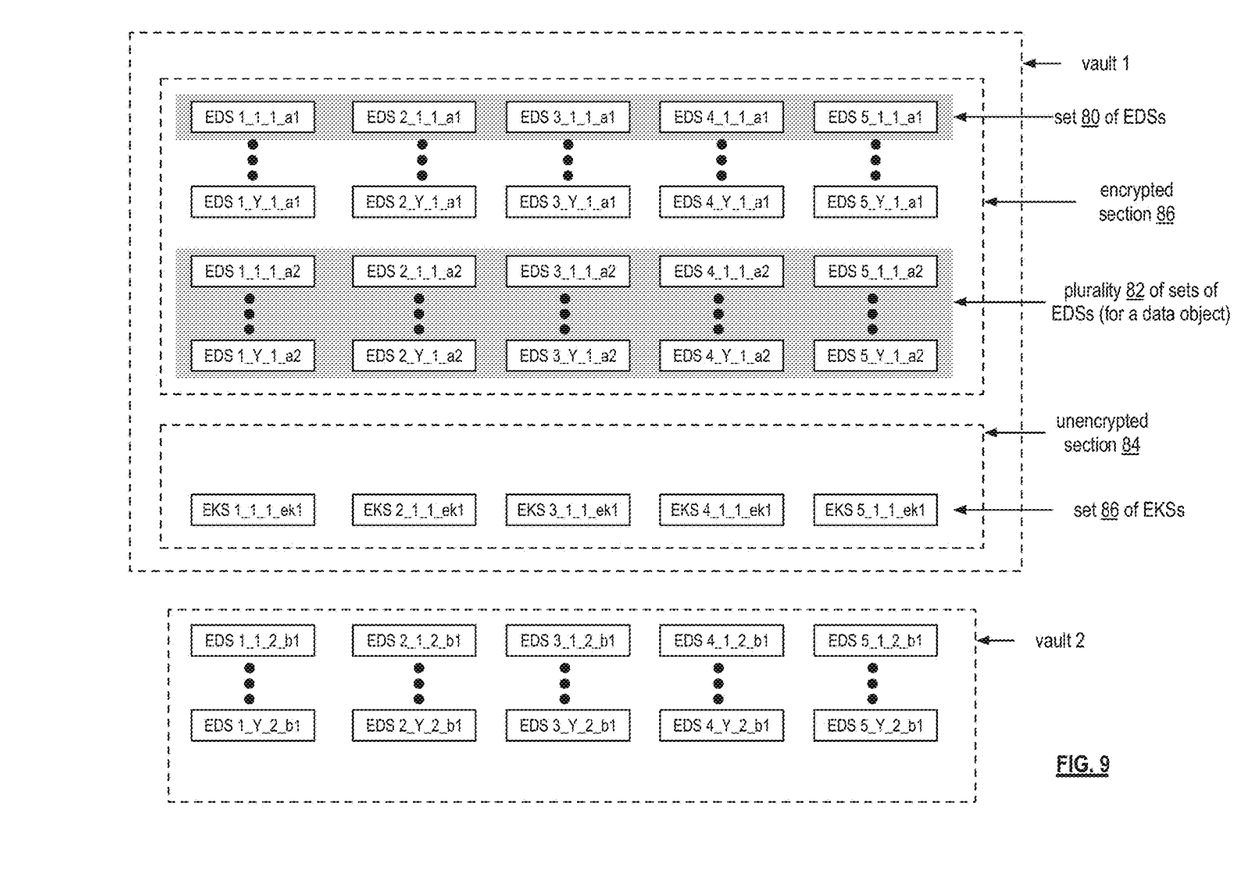
FIG. 9 is a schematic block diagram of an embodiment of vaults storing encoded data slices in accordance with the present invention.

FIG. 9 is a schematic block diagram of an example of vaults (e.g., 1 and 2) storing pluralities of sets of encoded data slices. Each plurality 82 of sets of encoded data slices (EDSs) corresponds to the encoding of a data object, a portion of a data object, or multiple data objects, where a data object is one or more of a file, text, data, digital information, etc. For example, the highlighted plurality of encoded data slices corresponds to a data object having a data identifier of "a2".

Each encoded data slice of each set 80 of encoded data slices is uniquely identified by its slice name, which is also used as at least part of a logical DSN address for storing the encoded data slice. As shown, a set of EDSs includes EDS 1_1_1a1 through EDS 5_1_1a1. The EDS number includes pillar number, data segment number, vault ID, and data object ID. Thus, for EDS 1_1_1a1, it is the first EDS of a first data segment of data object "a1" and is to be stored, or is stored, in vault 1.

As is further shown, another plurality of sets of encoded data slices are stored in vault 2 for data object "b1". There are Y sets of EDSs, where Y corresponds to the number of data segments created by segmenting the data object. The last set of EDSs of data object "b1" includes EDS 1_Y_2b1 through EDS 5_Y_2_b1. Thus, for EDS 1_Y_2b1, it is the first EDS of the last data segment "Y" of data object "b1" and is to be stored, or is stored, in vault 2.

A vault is a logical memory container supported by the storage units of the DSN and is allocated to store data for one or more user computing devices. A vault (e.g., vault 1) may include an unencrypted section 84 and an encrypted section 86. The encrypted section 86 stores encoded data slices that have been encrypted using one or more encryption keys. For example, a first data segment of data object "a1" is dispersed storage error encoded to produce a set of unencrypted encoded data slices set 80 (note that the first data segment may or may not be encrypted prior to the error encoding). Each unencrypted encoded data slice is encrypted using an encryption key (e.g., a shared encryption key, a unique encryption key for each slice, or a combination thereof). The resulting set of encrypted encoded data slices is stored in the encryption section 86 as a set 80 of EDSs.

The encryption key (e.g., shared, unique, or combination) is dispersed storage error encoded to produce a set 86 of encoded key slices, which is stored in the unencrypted section 84. Unless authorized by a DSN managing device, a trusted authority device, or other administrative device, each of the storage units supporting the vault (e.g., vault 1) does not have access to enough encoded key slices to recreate the encryption key (e.g., each storage unit has access to one encoded key slice). As such, the storage units do not have viewing rights to the encoded data slices (i.e., cannot decrypt the encoded data slices). Accordingly, any unauthorized access of a storage unit will not reveal any useful information about the encoded data slices, data segments, data objects, and/or computing devices authorized to access the data (e.g., read, write, edit, delete, etc.).

Figure 10:
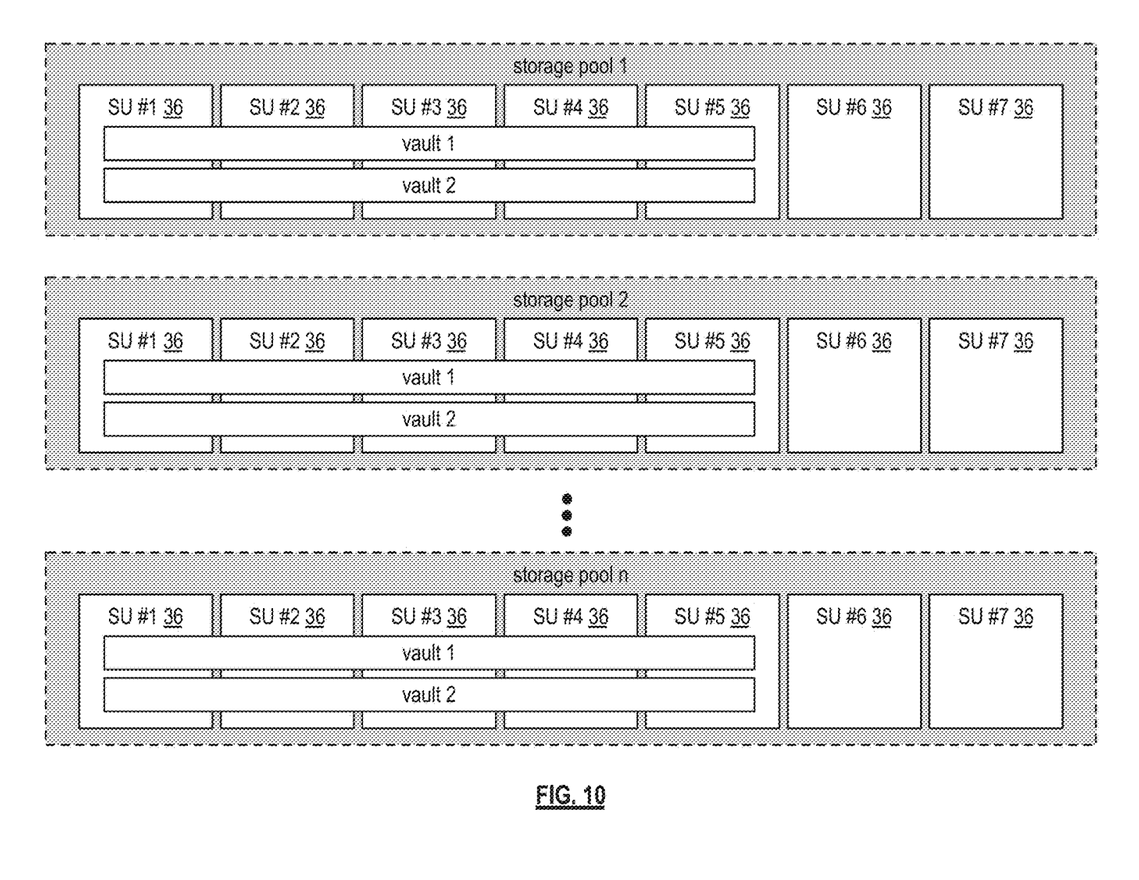
FIG. 10 is a schematic block diagram of an embodiment of vaults spanning one or more storage pools in accordance with the present invention.

FIG. 10 is a schematic block diagram of an example of vaults spanning multiple storage pools. In this example, the DSN memory 22 includes a plurality of storage units 36 arranged into a plurality of storage pools (e.g., 1-n). Further, each storage pool includes seven storage units for ease of illustration. A storage pool, however, can have many more storage units than seven and, from storage pool to storage pool, may have different numbers of storage units.

The storage pools 1-n support two vaults (vault 1 and vault 2) using only five of the seven of storage units. The number of storage units within a storage pool supporting a vault corresponds to the pillar width number, which is five in this example. Note that a storage pool may have rows of storage units, where SU #1 represents a plurality of storage units, each corresponding to a first pillar number; SU #2 represents a second plurality of storage units, each corresponding to a second pillar number; and so on. Note that other vaults may use more or less than a pillar width number of five storage units.

Figure 11:
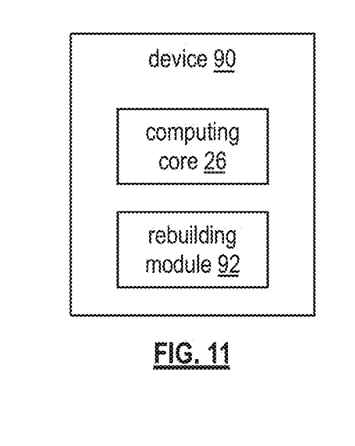
FIG. 11 is a schematic block diagram of an embodiment of a device in accordance with the present invention.

FIG. 11 is a schematic block diagram of an embodiment of a device 90 that includes the computing core 26 and a rebuilding module 92. The device 90 is one or more of computing device 12, computing device 16, managing unit 18, integrity processing unit 20, and storage unit 36. The rebuilding module 92 is a module operable with the device to perform one or more of the functions described in one or more of FIGS. 12-15.

Figure 12:
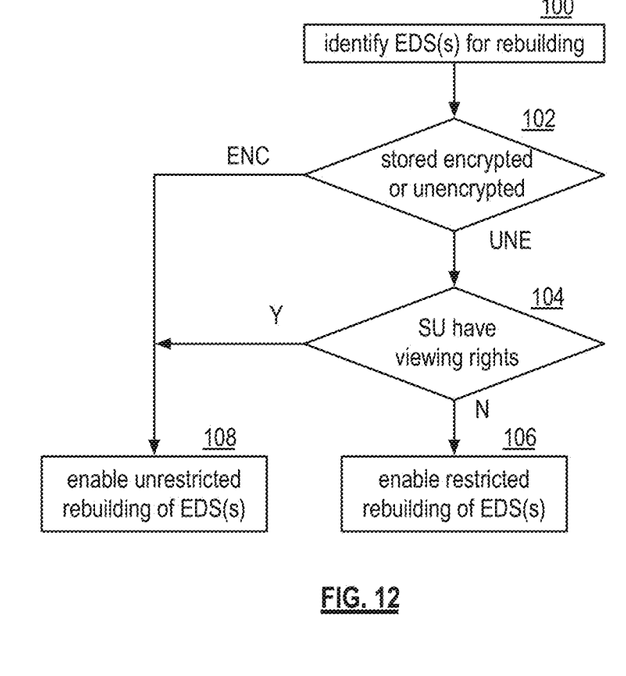
FIG. 12 is a logic diagram of an example of a method of multi option rebuilding in accordance with the present invention.

FIG. 12 is a logic diagram of an example of a method of multi option rebuilding that begins at step 100 where the rebuilding module of a device identifies an encoded slice for rebuilding, which may be done in a variety of ways. For example, the device receives a request to rebuild the encoded slice. As another example, the device determines that the encoded slice requires rebuilding because its revision level is wrong. As another example, the device determines that the encoded slice requires rebuilding because the storage unit storing the encoded slice did not response to a request regarding the encoded slice. As a further example, the device determines that the encoded slice requires rebuilding because its calculated integrity information does not match stored integrity information for the encoded slices.

The encoded slice is from a set of encoded slices that is created by dispersed storage error encoding a data element. In an example, the data element includes an encryption key that is used to encrypt data (e.g., one or more data segments of a data object) stored in the encrypted section of the vault. The encryption key is dispersed storage error encoded into a set of encoded key slices that is stored in the unencrypted section of the vault. As another example, the data element is a data segment of a data object that is dispersed storage error encoded into a set of encoded data slices. The set of encoded data slices is encrypted using an encryption key to produce an encrypted set of encoded data slices that is stored in the encrypted section of the vault. In yet another example, the data element is a data segment of a data object, wherein the data segment is dispersed storage error encoded into a set of encoded data slices that is stored in the unencrypted section of the vault supported by the set of storage units.

The method continues at step 102, where the rebuilding module determines whether the set of encoded slices is stored in an encrypted section of a vault or within an unencrypted section of the vault. When the set of encoded slices is stored in the unencrypted section of the vault, the method continues at step 104 where the rebuilding module determines (e.g., by default, by a look up, by instruction, etc.) whether the set of storage units have viewing rights (i.e., rights to see the data in its unencrypted form) for encoded data slices stored in the encrypted section.

When the set of storage units does not have the viewing rights, the method continues at step 106 where the rebuilding module enables a restricted rebuilding process to rebuild the encoded slice. An example of the restricted rebuilding process is discussed with reference to FIGS. 13 and 14.

When the set or storage units does have the viewing rights or when the set of encoded slices is stored in the encrypted section of the vault, the method continues at step 108 where the rebuilding module enables an unrestricted rebuilding process to rebuild the encoded slice. An example of the unrestricted rebuilding process is discussed with reference to FIG. 15.

If, while processing the rebuilding of the encoded slice, the rebuilding module identifies a second encoded slice of the set of encoded slices for rebuilding (i.e., the same set as the encoded slice being rebuilt and in a different storage unit of the set of storage units), the rebuilding module uses the determination of whether the set of storage units have viewing rights to the set of encoded slices. When the set of storage units does not have the viewing rights, the rebuilding module enables the restricted rebuilding process to rebuild the encoded slice and the second encoded slice in a sequential manner (i.e., the rebuilding of the second encoded slice does not commence until the rebuilding of the encoded slice is complete). When the set of storage units do have the viewing rights, the rebuilding module enables the unrestricted rebuilding process to rebuild the encoded slice and the second encoded slice substantially concurrently.

Figure 13:
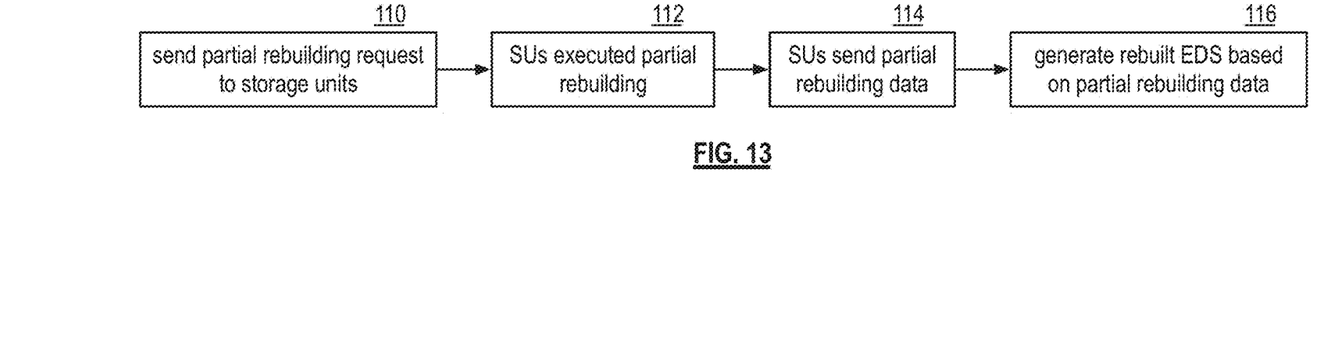
FIG. 13 is a logic diagram of another example of a method of multi option rebuilding in accordance with the present invention.

FIG. 13 is a logic diagram of another example of a method of restricted rebuilding that begins at step 110 where the rebuilding module sends a partial rebuilding request to a subset of storage units of the storage units (e.g., at least a decode threshold number). Note that the subset of storage units does not include the first storage unit, which is assigned to store the encoded slice being rebuilt. The method continues at step 112 where the storage units in the subset of storage units execute a partial rebuilding function for the encoded slice to produce partial slice rebuilding data. An example of creating the partial slice rebuilding data is discussed with reference to FIG. 14. The method continues at step 114 where the storage units send their respective partial slice rebuilding data to the rebuilding module. The rebuilding module receives the set of partial slice rebuilding data and generates therefrom a rebuilt encoded slice.

Figure 14:
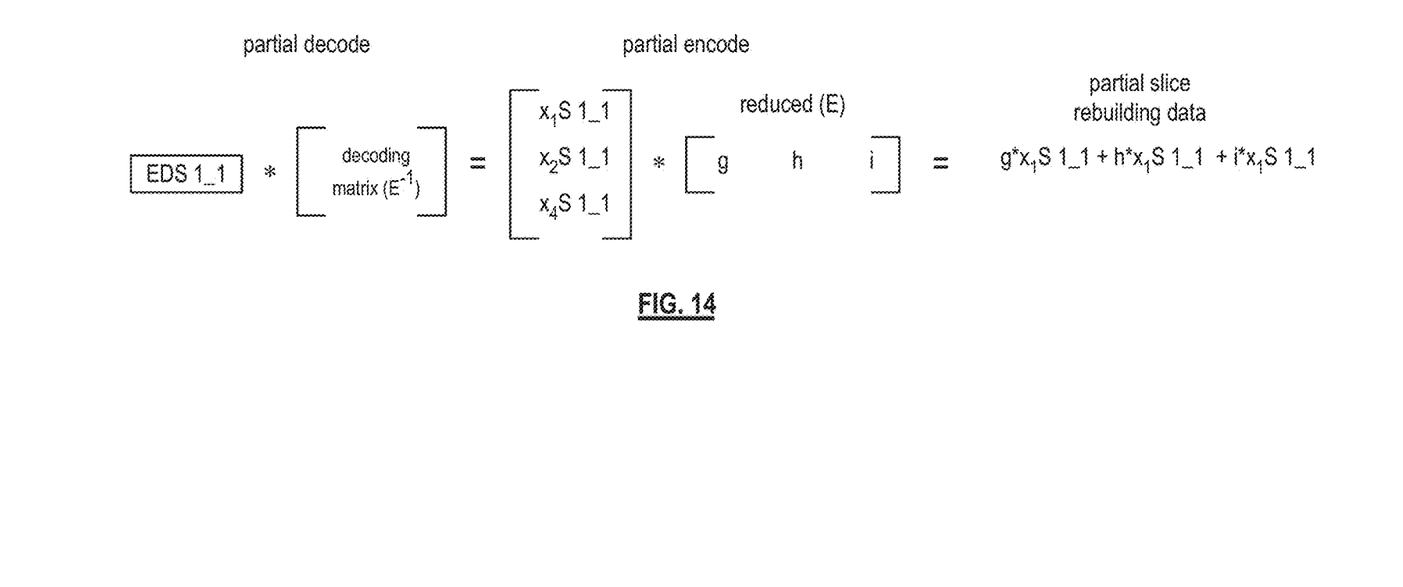
FIG. 14 is a diagram of an example of restricted rebuilding in accordance with the present invention.

FIG. 14 is a diagram of an example of a storage unit generating its partial slice rebuilding information in accordance with the restricted rebuilding function. This example assumes that encoded data slice EDS 3_1 is to be rebuilt. Accordingly, three of storage units 1, 2, 4, and 5 will generate partial slice rebuilding data. This example is from the perspective of storage unit 1, which stores encoded data slice EDS 1_1. Storage unit 1 performs a two-step process to generate the partial slice rebuilding data. In the first step, the storage unit performs a partial decoding of the encoded data slice EDS 1_1 using selected rows of the decoding matrix. This produces a partial decode matrix, which is illustrated to include $x_1 S1\_1$; $x_2 S1\_1$; and $x_3 S1\_1$. $x_1$, $x_2$, and $x_3$ are coefficients of the decoding matrix and S1_1 corresponds to the encoded data slice EDS 1_1.

The storage unit then performs a partial encoding step by matrix multiplying the partial decode matrix with a reduced encode matrix (E) to produce the partial slice rebuilding data. The reduced encoded matrix is reduced to a single row that corresponds to the row of the full encoded matrix that created encoded data slice EDS 3_1 (i.e., the one being rebuilt). In this example, the coefficients of the relevant row are g, h, and i, such that the first partial slice rebuilding data may be expressed in Gaussian Field as $g*x_1 S1\_1 + h*x_2 S1\_1 + i*x_3 S1\_1$.

The rebuilding module receives the partial slice rebuilding data from three storage units in this example. The rebuilding module performs a function on the set of partial slice rebuilding data to generate the rebuilt encoded data slice (EDS 3_1). For example, the rebuilding module performs an exclusive OR function on the set of partial slice rebuilding data to generate the rebuilt encoded data slice. For a more detailed discussion of partial rebuilding refer to issued patent entitled "METHOD AND APPARATUS FOR SLICE PARTIAL REBUILDING IN A DISPERSED STORAGE NETWORK" having a U.S. Pat. No. 8,706,980.

Figure 15:
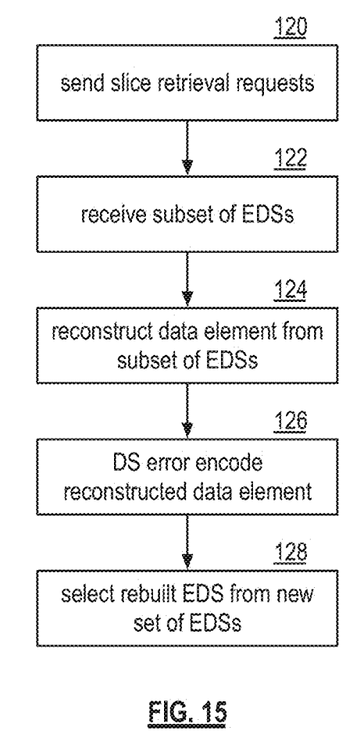
FIG. 15 is a logic diagram of another example of a method of multi option rebuilding in accordance with the present invention.

FIG. 15 is a logic diagram of another example of a method of unrestricted rebuilding that begins at step 120 where the rebuilding module sends slice retrieval requests to a subset of storage units of the storage units (e.g., at least a decoded threshold number of storage units), which does not include the storage unit that stores the encoded slice in need of rebuilding. In response to the slice retrieval requests, the method continues at step 122 where the rebuilding module receives a subset of encoded slices of the set of encoded slices from the subset of storage units (e.g., a decode threshold number of encoded slices, which does not include the encoded slice in need of rebuilding).

The method continues at step 124 where the rebuilding module reconstructs the data element (e.g., a data segment, an encryption key) from the subset of encoded slices. The method continues at step 126 where the rebuilding module dispersed storage error encodes the reconstructed data element to produce a new set of encoded slices. The method continues at step 128 where the rebuilding module selects one of the new set of encoded data slices as rebuilt encoded slice for the encoded slice (e.g., selects new EDS 3_1 as a rebuild slice for EDS 3_1).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
identifying, by a rebuilding module that is implemented based on at least one processing circuit within a device of a dispersed storage network (DSN), an encoded slice for rebuilding, wherein a data element is dispersed storage error encoded into a set of encoded slices, which includes the encoded slice, wherein a set of storage units of the DSN stores the set of encoded slices, and wherein a first storage unit of the set of storage units is assigned to store the encoded slice;
determining, by the rebuilding module, whether the set of encoded slices is stored in an encrypted section of a vault or within an unencrypted section of the vault;
when the set of encoded slices is stored in the unencrypted section of the vault, determining, by the rebuilding module, whether the set of storage units have viewing rights;
when the set of storage units does not have the viewing rights indicating that the set of storage units is unauthorized to access any useful information corresponding to the set of encoded slices, enabling, by the rebuilding module, a restricted rebuilding process to rebuild the encoded slice; and
when the set of storage units does have the viewing rights indicating that the set of storage units is authorized to access the useful information corresponding to the set of encoded slices, enabling, by the rebuilding module, an unrestricted rebuilding process to rebuild the encoded slice.

2. The method of claim 1 further comprises:
when the set of encoded slices is stored in the encrypted section of the vault, enabling, by the rebuilding module, the unrestricted rebuilding process for rebuilding the encoded slice.

3. The method of claim 1, wherein the data element comprises:
an encryption key that is used to encrypt data stored in the encrypted section of the vault, wherein the encryption key is dispersed storage error encoded into a set of encoded key slices that is stored in the unencrypted section of the vault supported by the set of storage units.

4. The method of claim 1, wherein the data element comprises:
a data segment of a data object, wherein the data segment is dispersed storage error encoded into a set of encoded data slices, wherein the set of encoded data slices is encrypted using an encryption key to produce an encrypted set of encoded data slices that is stored in the encrypted section of the vault supported by the set of storage units.

5. The method of claim 1, wherein the data element comprises:
a data segment of a data object, wherein the data segment is dispersed storage error encoded into a set of encoded data slices that is stored in the unencrypted section of the vault supported by the set of storage units.

6. The method of claim 1, wherein the enabling the restricted rebuilding process comprises:
sending, by the rebuilding module, a partial rebuilding request to a subset of storage units of the storage units, wherein the subset of storage units does not include the first storage unit;
executing, by each storage unit in the subset of storage units, a partial rebuilding function for the encoded slice to produce partial slice rebuilding data, wherein the subset of storage units produces a set of partial slice rebuilding data; and
generating, by the rebuilding module, a rebuilt encoded slice based on the set of partial slice rebuilding data.

7. The method of claim 1, wherein the enabling the unrestricted rebuilding process comprises:
sending, by the rebuilding module, slice retrieval requests to a subset of storage units of the storage units, wherein the subset of storage units does not include the first storage unit;
in response to the slice retrieval requests, receiving, by the rebuilding module, a subset of encoded slices of the set of encoded slices from the subset of storage units;
reconstructing, by the rebuilding module, the data element from the subset of encoded slices;
dispersed storage error encoding, by the rebuilding module, the reconstructed data element to produce a new set of encoded slices; and
selecting one of the new set of encoded slices as rebuilt encoded slice for the encoded slice.

8. The method of claim 1 further comprises:
identifying, by the rebuilding module, a second encoded slice of the set of encoded slices for rebuilding;
when the set of storage units does not have the viewing rights:
enabling, by the rebuilding module, the restricted rebuilding process to rebuild the encoded slice; and
when the rebuilding of the encoded slice is complete, enabling, by the rebuilding module, the restricted rebuilding process to rebuild the second encoded slice.

9. The method of claim 1 further comprises:
identifying, by the rebuilding module, a second encoded slice of the set of encoded slices for rebuilding; and
when the set of storage units does have the viewing rights, enabling, by the rebuilding module, the unrestricted rebuilding process to rebuild the encoded slice and the second encoded slice substantially concurrently.

10. A rebuilding module comprises:
a first module that is implemented based on at least one processing circuit and that, when operable within a device of a dispersed storage network (DSN), causes the device to:
identify an encoded slice for rebuilding, wherein a data element is dispersed storage error encoded into a set of encoded slices, which includes the encoded slice, wherein a set of storage units of the DSN stores the set of encoded slices, and wherein a first storage unit of the set of storage units is assigned to store the encoded slice;
a second module that is implemented based on the at least one processing circuit and that, when operable within the device, causes the device to:
determine whether the set of encoded slices is stored in an encrypted section of a vault or within an unencrypted section of the vault; and when the set of encoded slices is stored in the unencrypted section of the vault, determine whether the set of storage units have viewing rights; and a third module that is implemented based on the at least one processing circuit and that, when operable within the device, causes the device to:

when the set of storage units does not have the viewing rights indicating that the set of storage units is unauthorized to access any useful information corresponding to the set of encoded slices, enable a restricted rebuilding process to rebuild the encoded slice; and when the set of storage units does have the viewing rights indicating that the set of storage units is authorized to access the useful information corresponding to the set of encoded slices, enable an unrestricted rebuilding process to rebuild the encoded slice.

11. The rebuilding module of claim 10 further comprises:
a fourth module that is implemented based on the at least one processing circuit and that, when operable within the device, causes the device to:
when the set of encoded slices is stored in the encrypted section of the vault, enable the unrestricted rebuilding process for rebuilding the encoded slice.

12. The rebuilding module of claim 10, wherein the data element comprises:
an encryption key that is used to encrypt data stored in the encrypted section of the vault, wherein the encryption key is dispersed storage error encoded into a set of encoded key slices that is stored in the unencrypted section of the vault supported by the set of storage units.

13. The rebuilding module of claim 10, wherein the data element comprises:
a data segment of a data object, wherein the data segment is dispersed storage error encoded into a set of encoded data slices, wherein the set of encoded data slices is encrypted using an encryption key to produce an encrypted set of encoded data slices that is stored in the encrypted section of the vault supported by the set of storage units.

14. The rebuilding module of claim 10, wherein the data element comprises:
a data segment of a data object, wherein the data segment is dispersed storage error encoded into a set of encoded data slices that is stored in the unencrypted section of the vault supported by the set of storage units.

15. The rebuilding module of claim 10, wherein the third module, when operable within the device, further causes the device to enable the restricted rebuilding process by:

sending a partial rebuilding request to a subset of storage units of the storage units, wherein the subset of storage units does not include the first storage unit;

receiving, from each storage unit in the subset of storage units, a partial rebuilding function for the encoded slice to produce partial slice rebuilding data, wherein the subset of storage units produces a set of partial slice rebuilding data; and generating, by the rebuilding module, a rebuilt encoded slice based on the set of partial slice rebuilding data.

16. The rebuilding module of claim 10, wherein the third module, when operable within the device, further causes the device to enable the unrestricted rebuilding process by:

send slice retrieval requests to a subset of storage units of the storage units, wherein the subset of storage units does not include the first storage unit;

in response to the slice retrieval requests, receive a subset of encoded slices of the set of encoded slices from the subset of storage units;

reconstruct the data element from the subset of encoded slices;

dispersed storage error encode the reconstructed data element to produce a new set of encoded slices; and select one of the new set of encoded slices as rebuilt encoded slice for the encoded slice.

17. The rebuilding module of claim 10 further comprises:
the first module, when operable within the device, further causes the device to:
identify a second encoded slice of the set of encoded slices for rebuilding; and
the third module, when operable within the device, further causes the device to:
when the set of storage units does not have the viewing rights:
enable the restricted rebuilding process to rebuild the encoded slice; and
when the rebuilding of the encoded slice is complete, enable the restricted rebuilding process to rebuild the second encoded slice.

18. The rebuilding module of claim 10 further comprises:
the first module, when operable within the device, further causes the device to:
identify a second encoded slice of the set of encoded slices for rebuilding; and
the third module, when operable within the device, further causes the device to:
when the set of storage units does have the viewing rights, enable the unrestricted rebuilding process to rebuild the encoded slice and the second encoded slice substantially concurrently.

\* \* \* \* \*